United States Patent
Wu et al.

(10) Patent No.: US 9,544,952 B2
(45) Date of Patent: Jan. 10, 2017

(54) LINEAR DIMMING LED DRIVER CIRCUIT CAPABLE OF ADJUSTING COLOR TEMPERATURE

(71) Applicant: UNITY OPTO TECHNOLOGY CO., LTD., New Taipei (TW)

(72) Inventors: Chih-Hsien Wu, New Taipei (TW); Sen-Yuh Tsai, New Taipei (TW); Kai-Cheng Chuang, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 14/665,061

(22) Filed: Mar. 23, 2015

(65) Prior Publication Data

US 2016/0255683 A1    Sep. 1, 2016

(30) Foreign Application Priority Data

Feb. 26, 2015    (TW) .............................. 104202992 U

(51) Int. Cl.
*H05B 33/08* (2006.01)

(52) U.S. Cl.
CPC ........ *H05B 33/0812* (2013.01); *H05B 33/083* (2013.01); *H05B 33/089* (2013.01); *H05B 33/0827* (2013.01); *H05B 33/0845* (2013.01); *H05B 33/0857* (2013.01)

(58) Field of Classification Search
CPC ............ H05B 33/0815; H05B 33/0818; H05B 33/0884; H05B 33/0809; H05B 33/0848; H05B 33/0896; H05B 37/029; H05B 37/0245; H05B 37/0254; H05B 41/3925; H05B 41/391; H05B 41/2828; H05B 33/0803
USPC ......................................... 315/294, 224, 307
See application file for complete search history.

(56) References Cited

U.S. PATENT DOCUMENTS

| | | | | |
|---|---|---|---|---|
| 2011/0227489 A1* | 9/2011 | Huynh | ................. | H05B 33/083 315/185 R |
| 2012/0081009 A1* | 4/2012 | Shteynberg | .......... | H05B 33/083 315/122 |
| 2014/0300274 A1* | 10/2014 | Acatrinei | ........... | H05B 33/0815 315/85 |
| 2015/0132006 A1* | 5/2015 | Inoue | ................. | H05B 37/0263 398/118 |
| 2015/0289325 A1* | 10/2015 | Szolusha | ................ | H05B 33/08 315/201 |
| 2016/0044754 A1* | 2/2016 | Xu | ..................... | H05B 33/0845 315/186 |

* cited by examiner

*Primary Examiner* — Douglas W Owens
*Assistant Examiner* — Syed M Kaiser
(74) *Attorney, Agent, or Firm* — Rosenberg, Klein & Lee

(57) ABSTRACT

A linear dimming LED driver circuit capable of adjusting color temperature used in a lamp of a down light or a tube light to drive a plurality of LED strings to emit light and the LED strings are formed by yellow-light and ultra blue LEDs. The circuit uses a switch to switch the conduction of the LED strings to change the color temperature of the light emission of the lamp, so that the control module will adjust the light emitting brightness of the lamp for better dimming range and work performance of the whole circuit if a driving voltage is in a mono sinusoidal voltage section greater than or equal to 129 volts and smaller than or equal to 135 volts.

5 Claims, 3 Drawing Sheets

LINEAR DIMMING LED DRIVER CIRCUIT CAPABLE OF ADJUSTING COLOR TEMPERATURE

CROSS-REFERENCE TO RELATED APPLICATIONS

This non-provisional application claims priority under 35 U.S.C. §119(a) on Patent Application No(s). 104202992 filed in Taiwan, R.O.C. on Feb. 26, 2015, the entire contents of which are hereby incorporated by reference.

BACKGROUND OF THE INVENTION

1. Field of the Invention

The present invention relates to the field of power supply devices for light emitting diode (LED) lamps, and more particularly to a linear dimming LED driver circuit capable of adjusting color temperature that provides a higher energy conversion efficiency of the circuit and a better dimming range of the lamps through a single-stage modulation mode of a mono sinusoidal voltage section.

2. Description of the Related Art

At present, most driving devices for LED lamps use a switching power converter as the main circuit architecture, and the switching power converter is a general Fly-back, Forward, Boost, Buck, Push-pull, Half-bridge or Full-bridge circuit. With reference to FIG. 1 for a driving device 1 that uses the boost power converter as the main circuit architecture and has the function of increasing a voltage level required by a load, and the driving device 1 includes a dimming module 10, a rectification module 11, a control module 12 and an output module 13, and the control module 12 includes a control chip 120, a protective resistor 121, the transistor 122 and the sensing resistor 123. The dimming module 10 is a tri-electrode AC switch (TRIAC), and the sensing resistor 123 is connected in series through the transistor 121, so that when the TRIAC switches the conduction angle of an input voltage to adjust the brightness, the sensing resistor 123 detects the driving current of the LED to form a buck to be provided for the control chip 120 to compare the hock with the input voltage to output a high-level voltage or a low-level voltage to the transistor 122, so as to timely conduct or disconnect the transistor 122 to adjust the duty cycle of a Pulse Width Modulation (PWM) signal, and achieve the effect of controlling the outputted driving voltage to change the brightness of the light emitted from the LED. In this method, the driving voltage is increased or decreased in stages according to a change of sine wave of the input voltage. In other words, an output status of a multi-stage modulation is achieved to provide excellent working efficiency of the whole driver circuit. In other words, the working quality can meet the industrial requirements, but a specific component cost is incurred and cannot be lowered further.

In addition, although the conventional lamps adopt a mixture of blue-light LEDs together with yellow-light LEDs to produce a lamp with the required light color, but at the research and design stages of the blue-light LEDs and yellow-light LEDs, the lamps so produced have the issue of a light color error due to the physical properties of different LEDs and cannot be overcome easily. In other words, the number of blue-light LEDs or yellow-light LEDs for actual light emission cannot be increased, so that manufacturers have to inspect and eliminate a large quantity of products with the aforementioned color issue before the products exit the factory. As a consequence, the yield rate is lowered and the inventory of defects is increased, and such consequence is not conducive to the economic development of the industry.

In view of the aforementioned problems, it is a main subject of the present invention to mix the blue-light LEDs with the yellow-light LEDs in the lamp and use them as the light source, and further simplify the circuit architecture and lower the production cost while keeping a high working efficiency and providing a wide dimming range, so as to achieve the effects of flexibly adjusting the light color and improving the cost-effectiveness.

SUMMARY OF THE INVENTION

In view of the problems of the prior art, it is a primary objective of the present invention to provide a linear dimming LED driver circuit capable of adjusting color temperature, wherein a simple single-stage modulation technique is used to achieve the effects of providing the most appropriate energy conversion efficiency of the whole circuit and adjusting the dimming range of the lamp.

To achieve the aforementioned and other objectives, the present invention provides a linear dimming LED driver circuit capable of adjusting color temperature used in a lamp of a down light or a tube light for driving a plurality of LED strings to emit light, and the LED driving device comprises a dimming module, a rectification module, a conversion module, a control module and an output module, and the rectification module is electrically coupled to an external power supply through the dimming module, and the control module is electrically coupled to the conversion module and the output module, and the output mode is electrically coupled to the LED strings, and the control module includes a control chip, a regulator and a sensing resistor, and the LED strings are coupled to the control chip through the serially connected regulator and sensing resistor, so that after the sensing resistor senses a driving current flowing through a driving current of the LED strings, a sensed value is generated and fed back to the control chip, and provided for the control chip to compare a reference value with the sensed value and control the regulator to regulate the driving current, characterized in that the output module includes a switch, and the LED strings have a total forward bias voltage falling within a range from 129 volts (V) to 135 volts (V), and the LED strings are at least divided into a first string, a second string, a third string, a fourth string and a fifth string, and an end of the fourth string is coupled to the third string and the fifth string, and the other end of the fourth string is coupled to the first string and the second string, and the first string, the second string and the third string are coupled to an output end of the switch, and the second string and the third string are formed by ultra blue LEDs; the output module is provided for switching the switch to conduct the first string, the second string or the third string and then changing the color temperature of the light emission of the lamp, so that the control module light adjusts the light emitting brightness of the lamp for better dimming range and work performance of the whole circuit if a driving voltage is in a mono sinusoidal voltage section greater than or equal to 129 volts and smaller than or equal to 135 volts.

Wherein, the rectification module is a full-wave bridge rectifier, and the dimming module is a tri-electrode AC switch, for receiving and adjusting an input phase conduction angle of the external power supply to change an input power and then forming a dimming signal to drive the control chip to control the regulator to regulate the magnitude of current flowing through the LED strings, so as to change the illumination intensity of the lamp.

In addition, the first string includes six yellow-light LEDs, the second string includes six 10000-12000K ultra blue LEDs, the third string includes eight 10000-12000K ultra blue LEDs, the fourth string includes two yellow-light LEDs, and the fifth string includes nine yellow-light LEDs. The first string, the fourth string and the fifth string form a first one of the LED strings with a color temperature of 2700K; the second string, the fourth string and the fifth string form a second one of the LED strings with a color temperature of 4000K; and the third string and the fifth string form a third one of the LED strings with a color temperature of 5000K. The regulator is a transistor installed to a surface of a lamp panel of the lamp to enhance the cooling efficiency, and the LED strings are coupled to a driving capacitor for charging and discharging the driving current to enhance the noise resistance of the circuit.

In summation of the description above, the present invention improves the applicability of the product by flexibly adjusting the light color of the lamp through a simple switch and maintains the driving voltage constant, so that the driving voltage will not be increased or decreased at stages according to the change of sine wave of the external power supply, and the control chip controls the brightness of the single voltage section of 129-135V to provide the most appropriate working performance of the overall driver circuit, improve the power utilization and light adjustable range, and lower the component cost.

DETAILED DESCRIPTION OF THE PREFERRED EMBODIMENTS

The technical content of the present invention will become apparent with the detailed description of preferred embodiments and the illustration of related drawings as follows.

Figure 1:
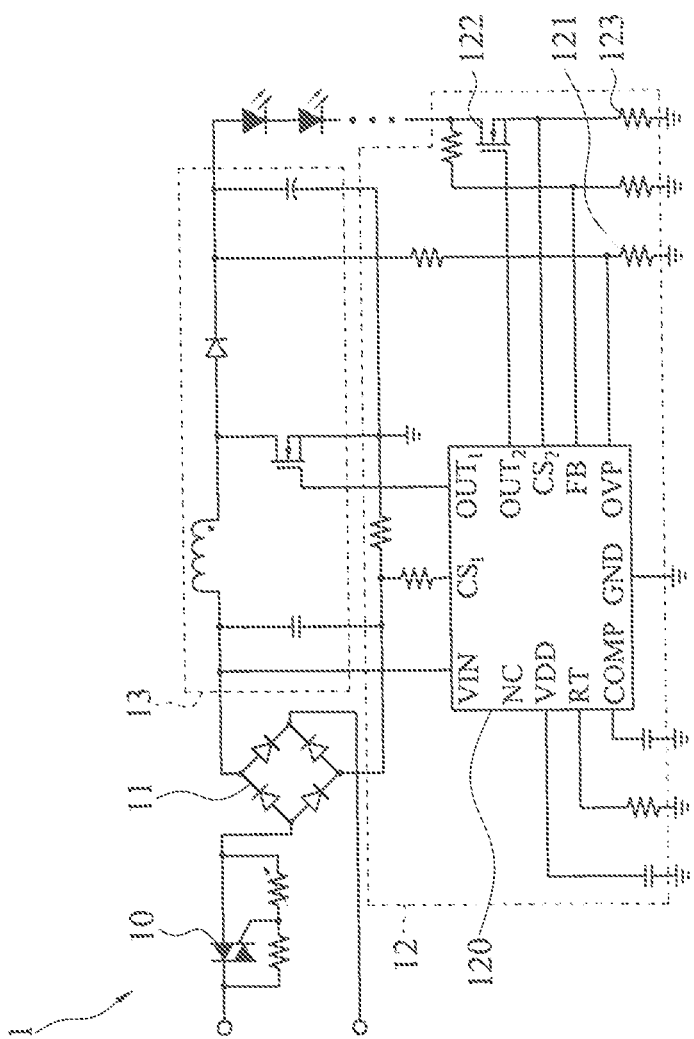
FIG. 1 is a schematic circuit diagram of a conventional boost driver.
Figure 2:
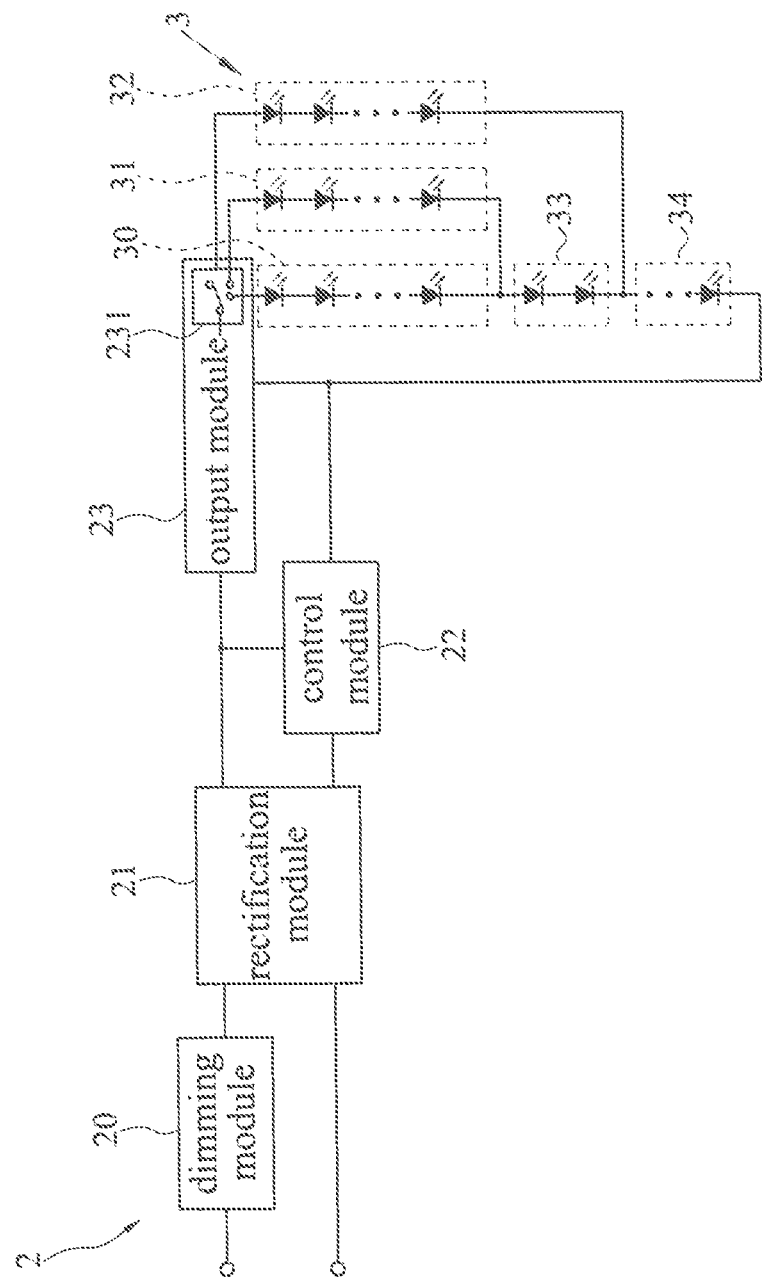
FIG. 2 is a schematic block diagram of a preferred embodiment of the present invention.
Figure 3:
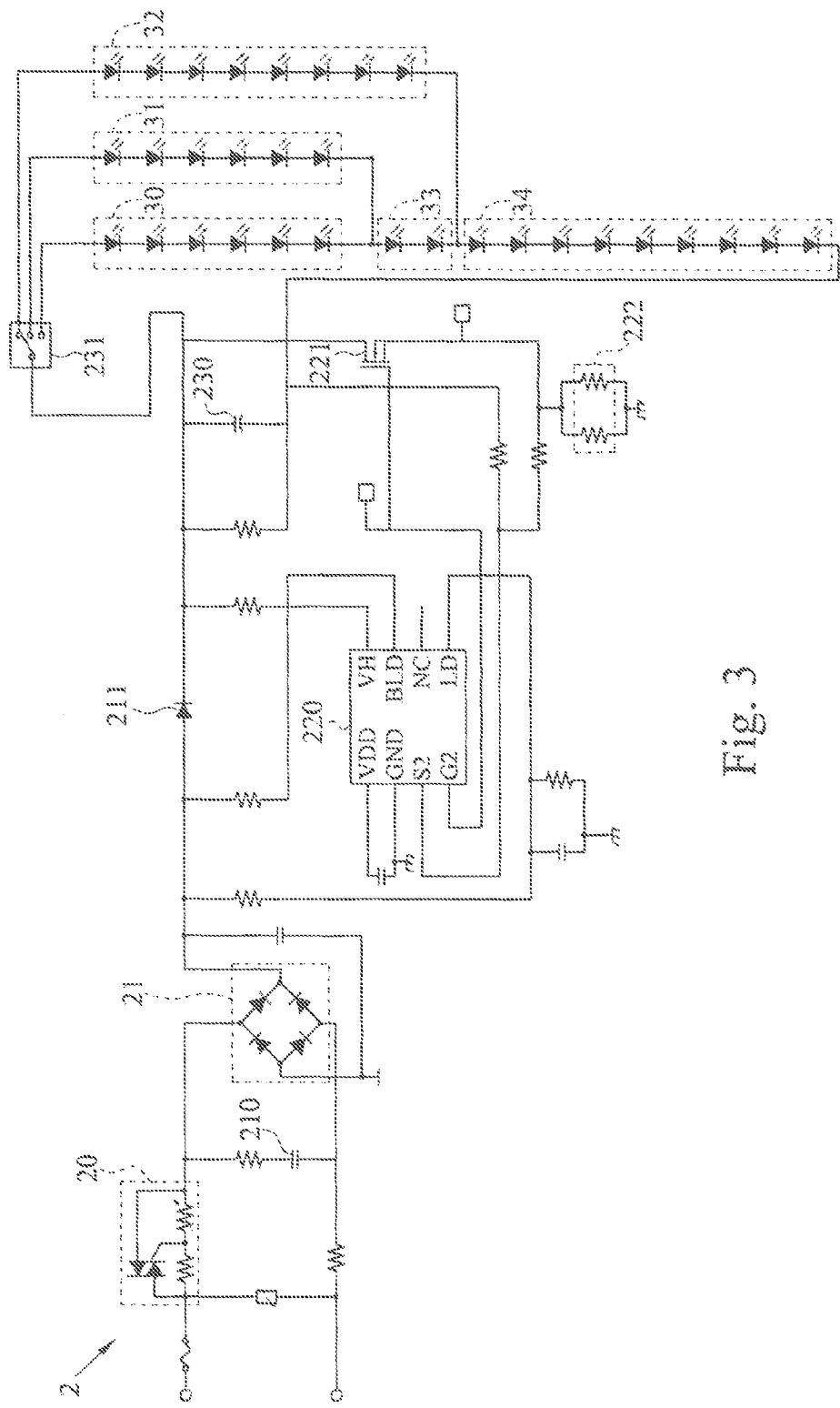
FIG. 3 is a schematic circuit diagram of a preferred embodiment of the present invention.

With reference to FIGS. 2 and 3 for a schematic block diagram and a circuit diagram of a preferred embodiment of the present invention respectively, the linear dimming LED driver circuit 2 capable of adjusting color temperature is provided for a lamp of a down light or a tube light to drive a plurality of LED strings 3 to emit light, and the LED strings 3 are at least divided into a first string 30, a second string 31, a third string 32, a fourth string 33 and a fifth string 34, and the total forward bias voltage of each LED string 3 falls within a range of 129V-135V. The linear dimming LED driver circuit 2 comprises a dimming module 20, a rectification module 21, a control module 22 and an output module 23, and the control module 22 includes a control chip 220, a regulator 221 and a sensing resistor 222 installed therein, and the output module 23 includes a driving capacitor 230 and a switch 231. The dimming module 20 is a TRIAC, the rectification module 21 is a full-wave bridge rectifier, and the output terminal is coupled to a voltage regulating capacitor 210 and then coupled to an eternal power supply (not shown in the figure) through the TRIAC, and the output end is electrically coupled to the LED strings 3 through a diode 211 and the switch 230 for rectifying an AC voltage of the external power supply to form an input variable DC voltage, which is filtered by the diode 211 and the output module 23 to form a driving voltage to be outputted to the LED strings 3. Now, the dimming module 20 receives and regulates a phase conduction angle of the AC voltage to change the total input voltage outputted from the rectification module 21. In other words, a dimming signal is generated after the input power is changed, so as to drive the control chip 220 to control the operation of the regulator 221 to regulate the magnitude of the current flowing through the LED strings 3 and then change the illumination intensity of the lamp.

The control module 22 is electrically coupled to the rectification module 21 and the LED strings 3, and the LED strings 3 is electrically coupled to the driving capacitor 230 for charging and discharging the driving current to enhance the noise resistance of the circuit. The LED strings 3 are coupled to the control chip 220 through the serially connected regulator 221 and sensing resistor 222, so that after the sensing resistor 222 senses a driving current passing through the LED strings 3, a sensed value is generated and fed back to the control chip 220 and provided for the control chip 220 to compare the sensed value with a reference value and control the regulator 221 to regulate the driving current. In addition, the regulator 221 is a transistor installed on a surface of a lamp panel of the lamp to enhance the cooling efficiency, and the voltage regulating capacitor 210 is an electrolytic capacitor provided for reducing current ripples and prevent damages to the electronic components caused by a surge voltage generated spontaneously during the TRIAC dimming, and thus the invention provides an effect of circuit protection.

In addition, an end of the fourth string 33 is coupled to the third string 32 and the fifth string 34, and the other end of the fourth string 33 is coupled to the first string 30 and the second string 31, and the first string 30, the second string 31 and the third string 32 are coupled to an output end of the switch 23, and the second string 31 and the third string 32 are formed by ultra blue LEDs. The output module 23 is provided for switching the switch 230 to conduct the first string 30, the second string 31 or the third string 32 and then changing the color temperature of the light emission of the lamp, so that the control module 22 will adjust the light emitting brightness of the lamp for better dimming range and work performance of the whole circuit if a driving voltage is in a mono sinusoidal voltage section greater than or equal to 129 volts and smaller than or equal to 135 volts.

In this preferred embodiment, each LED string 3 may have 17 LEDs. The first string 30 has six yellow-light LEDs, the second string 31 has six 10000-12000K ultra blue LEDs, the third string 32 has eight 10000-12000K ultra blue LEDs, the fourth string 33 has two yellow light LEDs and the fifth string 34 has nine yellow-light LEDs, wherein the first string 30, the fourth string 33 and the fifth string 34 form one of the LED strings 3 with a color temperature of 2700K; the second string 31, the fourth string 33 and the fifth string 34 form another one of the LED strings 3 with a color temperature of 4000K; and the third string 32 and the fifth string 34 form a further one of the LED strings 3 with a color temperature of 5000K.

The switch 230 may be a jumper installed on a lamp panel of the lamp and provided for lamp manufactures to switch the switch 230 to change the conduction status of the first string 30, the second string 31 or the third string 32 before the lamp products exit the factory, so that the ON or OFF status of the second string 31 or the third string 32 with the ultra blue LEDs may provide a colder color or a warmer color of the light emitted from the lamp in order to change the color temperature of the lamp. The manufacturers may flexibly adjust the light color of the lamps before the lamp product exit the factory, so as to meet the order requirements and reduce the defective rate and the inventory of defects.

What is claimed is:

1. A linear dimming LED driver circuit capable of adjusting color temperature, used in a lamp of a down light or a tube light to drive a plurality of LED strings to emit light, and the linear dimming LED driver circuit being composed of a dimming module, a rectification module, a control module and an output module, and the rectification module being electrically coupled to an external power supply through the dimming module, and the control module being electrically coupled to the output module, and the output module being electrically coupled to the LED strings, and the control module including a control chip, a regulator and a sensing resistor installed therein, and the LED strings being coupled to the control chip through the regulator and the sensing resistor, such that the sensing resistor senses a driving current passing through the LED strings and then forms a sensed value to be fed back to the control chip, and provided for the control chip to compare the sensed value with a reference value, so as to control the regulator to regulate the driving current, characterized in that the output module includes a switch, the LED strings have a total forward bias voltage falling within a range of 129 volts to 135 volts, and the LED strings are at least divided into a first string, a second string, a third string, a fourth string and a fifth string, and an end of the fourth string is coupled to the third string and the fifth string, and the other end of the fourth string is coupled to the first string and the second string, and the first string, the second string and the third string is coupled to an output end of the switch, and the second string and the third string are formed by ultra blue LEDs; the output module is provided for switching the switch to conduct the first string, the second string or the third string and then changing the color temperature of the light emission of the lamp, so that the control module will adjust the light emitting brightness of the lamp for better dimming range and work performance of the whole circuit if a driving voltage is in a mono sinusoidal voltage section greater than or equal to 129 volts and smaller than or equal to 135 volts, wherein the regulator and the sensing resistor are serially connected.

2. The linear dimming LED driver circuit capable of adjusting color temperature according to claim 1, wherein the rectification module is a full-wave bridge rectifier, and the dimming module is a tri-electrode AC switch, for receiving and adjusting an input phase conduction angle of the external power supply to change an input power and then forming a dimming signal to drive the control chip to control the regulator to regulate the magnitude of current flowing through the LED strings, so as to change the illumination intensity of the lamp.

3. The linear dimming LED driver circuit capable of adjusting color temperature according to claim 2, wherein the first string includes six yellow-light LEDs, the second string includes six 10000-12000K ultra blue LEDs, the third string includes eight 10000-12000K ultra blue LEDs, the fourth string includes two yellow-light LEDs, and the fifth string includes nine yellow-light LEDs.

4. The linear dimming LED driver circuit capable of adjusting color temperature according to claim 3, wherein the first string, the fourth string and the fifth string form a first one of the LED strings with a color temperature of 2700K; the second string, the fourth string and the fifth string form a second one of the LED strings with a color temperature of 4000K; and the third string and the fifth string form a third one of the LED strings with a color temperature of 5000K.

5. The linear dimming LED driver circuit capable of adjusting color temperature according to claim 4, wherein the regulator is a transistor installed to a surface of a lamp panel of the lamp to enhance the cooling efficiency, and the LED strings are coupled to a driving capacitor for charging and discharging the driving current to enhance the noise resistance of the circuit.

* * * * *